United States Patent Office 3,165,510
Patented Jan. 12, 1965

---

3,165,510
4,4'-DISUBSTITUTED DIPHENYL SULFONES AND PROCESS OF MAKING SAME
Lambert Hoenen and Hans Loeschner, Stolberg, Rhineland, and Heinrich Mueckter, Aachen, Germany, assignors, by mesne assignments, to Protochemie AG, Glarus, Switzerland, a corporation of Switzerland
No Drawing. Filed July 25, 1961, Ser. No. 126,513
Claims priority, application Germany, July 26, 1960, C 22,003
18 Claims. (Cl. 260—239.8)

The present invention relates to new and valuable 4,4'-disubstituted diphenyl sulfones and more particularly to 4,4'-di-ureido or, respectively, thio-ureido diphenyl sulfones, and to a process of making such compounds.

The new 4,4'-disubstituted diphenyl sulfones correspond to the following Formula I

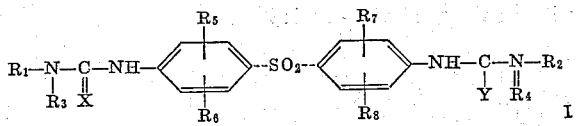

wherein
$R_1$ and $R_2$ represent the same or different substituents and indicate a γ-pyridyl residue or a phenyl radical, substituted at least in the p-position by the hydroxyl or the mercapto group which groups may be esterified or etherified, or by halogen, the nitro group, an amino group, the azomethine group formed on reaction of the amino group with an aldehyde or a ketone, or by an unsubstituted or substituted alkyl radical;
$R_3$ and $R_4$ represent the same or different substituents and indicate hydrogen or an unsubstituted or substituted alkyl radical;
$R_5$, $R_6$, $R_7$, and $R_8$ represent the same or different substituents and indicate hydrogen, lower alkyl radicals, hydroxyl or mercapto groups, which may be esterified or etherified, carboxyl groups, which may be esterified, nitro groups, or halogen; and
X and Y represent the same or different substituents and indicate oxygen or sulfur.

The new compounds according to the present invention have a remarkable antiviral activity as is evident from the following animal tests. For instance, more than 50% of white mice which had been infected with influenza virus A of the strain PR 8 survived the infection when treated for 5 days with a daily dose of 2.5 mg. per 20 g. of body weight of 4,4'-bis-(p-hydroxy phenyl ureido) diphenyl sulfone, whereas all untreated infected control animals died after an average of 9 days after infection. This chemotherapeutic activity is of special interest in view of the low toxicity of the new compounds. For instance, the oral $LD_{50}$ in mice (i.e. the amount of compound which causes a 50% mortality rate of the treated animals) for 4,4'-bis-(p-hydroxy phenyl ureido) diphenyl sulfone amounts to more than 100 mg./20 g. body weight. Similar results were obtained by testing other compounds of Formula I, for instance, 4,4'-bis-(γ-pyridyl ureido) diphenyl sulfone, 4,4'-bis-(p-mercapto phenyl ureido) diphenyl sulfone, and others.

The new compounds of Formula I are prepared, for instance, by reacting an amine of Formula II

(II)

wherein
$R_1$ and $R_3$ represent the same substituents indicated above
with a compound of Formula III

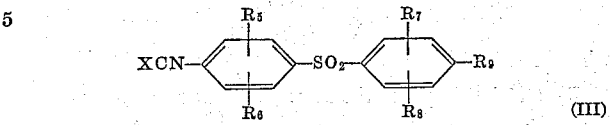

(III)

wherein
X, $R_5$, $R_6$, $R_7$, and $R_8$ represent the same substituents as indicated above and
$R_9$ indicates one of the groups

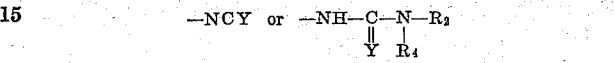

wherein
Y, $R_2$, and $R_4$ represent the same substituents as indicated above,
or with a compound of Formula IV

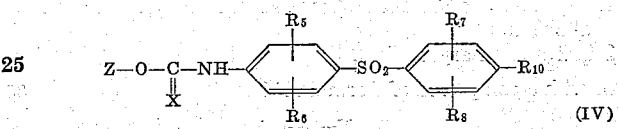

(IV)

wherein
X, $R_5$, $R_6$, $R_7$, and $R_8$ represent the same substituents as indicated above;
Z represents an aryl radical; and
$R_{10}$ indicates one of the groups

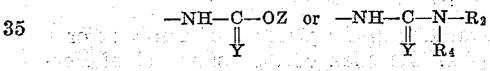

wherein
Y, Z, $R_2$, and $R_4$ represent the same substituents as indicated above,
or with a compound of Formula V

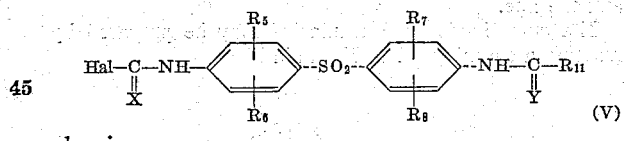

(V)

wherein
$R_5$, $R_6$, $R_7$, $R_8$, X, and Y represent the same substituents as indicated above;
Hal indicates halogen; and
$R_{11}$ indicates halogen or the group

wherein
$R_2$ and $R_4$ represent the same substituents as indicated above
preferably by heating in the presence of a solvent or a suspending agent. Reaction of the compound of Formula II with the compound of Formula V is preferably carried out in the presence of a compound capable of binding hydrogen halide such as an inorganic or organic base, an alkali metal carbonate, and the like agents.

The new valuable products may also be prepared by reacting a compound of Formula VI

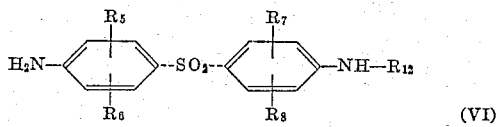   (VI)

wherein $R_5$, $R_6$, $R_7$, and $R_8$ represent the same substituents as indicated above; and $R_{12}$ indicates hydrogen or the group

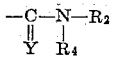

wherein

Y, $R_2$, and $R^4$ represent the same substituents as indicated above, with a compound of Formula VII $$R_1\text{—NCX} \qquad (VII)$$

wherein $R_1$ and X represent the same substituents as indicated above;

or with a compound of Formula VIII

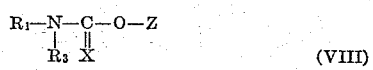   (VIII)

wherein $R_1$, $R_3$, and X represent the same substituents as indicated above and Z indicates an aryl radical, or with a compound of Formula IX

   (IX)

wherein $R_1$, $R_3$, and X represent the same substituents as indicated above and Hal indicates halogen, preferably by heating in the presence of a solvent or a suspending agent. Reaction of the compound of Formula VI with the compound of Formula IX is preferably carried out in the presence of a compound capable of binding hydrogen halide such as an amine, for instance, pyridine or triethylamine, or an inorganic base, for instance, an alkali metal carbonate, an alkali metal acetate, and the like.

The compounds of Formula VI may be prepared by reacting a sulfinic acid of Formula X

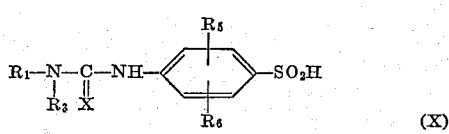   (X)

wherein $R_1$, $R_3$, $R_5$, $R_6$, and X represent the same substituents as indicated above, or a salt of such a sulfinic acid, with a compound of Formula XI

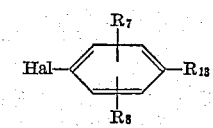   (XI)

wherein $R_7$ and $R_8$ represent the same substituents as indicated above;

Hal indicates halogen; and $R_{13}$ indicates the nitro group or, if at least one of the reference characters $R_7$ and $R_8$ indicate the nitro group, the group

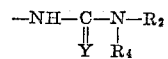

wherein $R_2$, $R_4$, and Y represent the same substituents as indicated above, preferably in the presence of a solvent or a suspending agent. If $R_{13}$ indicates the nitro group, the resulting compound is reduced to convert the nitro group into the amino group.

The new compound of Formula I may furthermore be prepared by reacting a compound of Formula XII

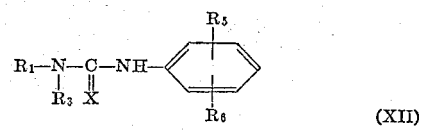   (XII)

wherein $R_1$, $R_3$, $R_5$, $R_6$, and X represent the same substituents as indicated above, with a compound of Formula XIII $$A\text{—}SO_2\text{—}B \qquad (XIII)$$

wherein

A and B represent the same or different substituents and indicate hydroxyl groups or halogen, or with a compound of Formula XIV

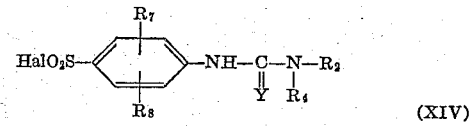   (XIV)

wherein $R_2$, $R_4$, $R_7$, $R_8$, and Y represent the same substituents as indicated above, and Hal indicates halogen, preferably by heating in the presence of a catalyst such as aluminum chloride.

The new compound of Formula I may also be prepared by oxidizing a compound of Formula XV

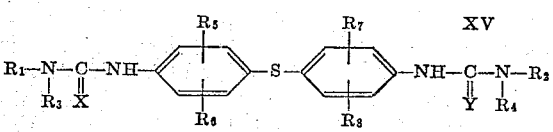   XV wherein $R_1$, $R_2$, $R_3$, $R_4$, $R_5$, $R_6$, $R_7$, $R_8$, X, and Y represent the same substituent as indicated above, or the corresponding sulfoxide, obtained from a sulfide compound, for instance, by treating with an alkali metal or alkaline earth metal permanganate, with hydrogen peroxide, with chlorine, or with chromium trioxide. Such oxidation is preferably carried out in the presence of an acidic solvent. However, when using an alkali metal or an alkaline earth metal permanganate, oxidation may also be effected in the presence of an inorganic or organic base and with a solvent.

The following examples illustrate the present invention without, however, limiting the same thereto.

*Example 1*

A solution of 10.9 g. of p-amino phenol in 370 ml. of dry dioxane is placed in a three-necked flask equipped with a mechanical stirrer and a reflux condenser and is heated therein on a water bath. While stirring, 12.4 g. of diphenyl sulfone-4,4'-di-isocyanate dissolved in 370 ml. of dry dioxane are added thereto. The mixture is heated for one hour and is then stored until cool. The precipitated crystals are filtered off, dissolved in warm isopropanol, and treated with activated charcoal. After filtering, the filtrate is diluted with ether. 4,4'-bis-(p-hydroxy phenyl ureido) diphenyl sulfone is obtained in a yield of 84.8% of the theoretical yield. It melts at 188-190° C. with decomposition.

By proceeding in the same manner and reacting diphenylsulfone-4,4'-di-isocyanate with other aniline derivatives, substituted at least in p-position, the following compounds were obtained.

(a) From 2,4-dimethyl aniline: 4,4'-bis-(o,p-dimethyl phenyl ureido) diphenyl sulfone in a yield of 71%. Melting point: 255-257° C.

(b) From p-nitro aniline: 4,4'-bis-(p-nitro phenyl ureido) diphenyl sulfone melting at 166° C. with decomposition. Yield 81.9%.

(c) From p-amino thiophenol: 4,4'-bis-(p-mercapto phenyl ureido) diphenyl sulfone. Yield 84%; melting point: 207-209° C.

(d) From the Schiff base obtained from α-pyridine aldehyde and p-phenylene-diamine which is p-amino-(α-pyridine aldehyde) anil: The Schiff base of α-pyridine aldehyde and 4,4'-bis-(p-amino phenyl ureido) diphenyl sulfone in a yield of 71.5%. It melts above 300° C.

(e) p-Amino-(β-pyridine aldehyde) anil yields 69.3% of the Schiff base of β-pyridine aldehyde and 4,4'-bis-(p-amino phenyl ureido) diphenyl sulfone. Melting point: 212° C. with decomposition.

(f) p-Amino-(γ-pyridine aldehyde) anil yields 74.9% of the Schiff base of γ-pyridine aldehyde and 4,4'-bis-(p-amino phenyl ureido) diphenyl sulfone melting above 300° C.

(g) p-Amino-(α-quinoline aldehyde) anil yields 56.3% of the Schiff base between α-quinoline aldehyde and 4,4'-bis-(p-amino phenyl ureido) diphenyl sulfone melting at 280° C. with decomposition.

(h) ω-Bromo-p-amino acetophenone yields 76.8% of 4,4'-bis-(p-bromo acetyl phenyl ureido) diphenyl sulfone melting at 187° C. with decomposition.

*Example 2*

In place of p-amino phenol used in Example 1 there are employed 9.4 g. of γ-amino pyridine while otherwise the procedure is the same as described in Example 1. 4,4'-bis-(γ-pyridyl ureido) diphenyl sulfone is obtained in a yield of 76.3%. Melting point: 188° C.

*Example 3*

A solution of 12.4 g. of 4,4'-diamino diphenyl sulfone in 100 ml. of dry tetrahydrofuran is added to a solution of 18.8 g. of 3,4-dichloro phenyl isocyanate in 150 ml. of dry tetrahydrofuran. After heating the reaction mixture on a water bath for one hour, the solvent is distilled off. The residue is dissolved in 2-ethoxy ethanol. Diethyl ether is added to the resulting solution. The mixture is allowed to stand until precipitation of 4,4'-bis-(m,p-dichloro phenyl ureido) diphenyl sulfone is completed. The precipitate is filtered off. Yield: 77%. Melting point: 258-259° C.

*Example 4*

A solution of 12.4 g. of 4,4'-diamino diphenyl sulfone in 150 ml. of dry dioxane is treated with 20.7 g. of p-(n-butoxy) phenyl isothiocyanate. The reaction mixture is gently refluxed for five hours, treated with charcoal, and filtered. The filtrate is evaporated to dryness. The residue is extracted with hot isopropanol. 4,4'-bis(p-n-butoxy phenyl thio-ureido) diphenyl sulfone precipitates on cooling. Yield: 53.8%; melting point: 156° C.

In the same manner as described hereinabove 4,4'-diamino diphenyl sulfone is reacted with other phenyl isothiocyanates such as those given hereinafter, whereby the following compounds are obtained:

(a) From p-hydroxy phenyl isothiocyanate: 4,4'-bis-(p-hydroxy phenyl thio-ureido) diphenyl sulfone melting at 129° C. with decomposition. Yield: 69.8%.

(b) From p-acetyl phenyl isothiocyanate: 4,4'-bis-(p-acetyl phenyl thio-ureido) diphenyl sulfone melting at 159° C. with decomposition. Yield 72.4%.

*Example 5*

25.5 g. of phenyl p-acetyl phenyl carbaminate are dissolved in 50 ml. of dimethyl formamide. A solution of 10.8 g. of 4,4'-diamino diphenyl sulfone in 80 ml. of dioxane is added to said solution. The reaction mixture is refluxed for twelve hours and is then evaporated to dryness. The residue crystallizes and yields 4,4'-bis-(p-acetyl phenyl ureido) diphenyl sulfone melting at 247° C. with decomposition. Yield: 61.7%.

*Example 6*

A solution of 15 g. of diphenyl sulfone-4,4'-di-isocyanate in 100 ml. of acetone is added to a solution of 18.9 g. of the sodium salt of N-(p-hydroxy-phenyl) glycine in 80 ml. of water while stirring. The reaction mixture is heated for two hours on a water bath and is then evaporated to dryness. The residue is treated with acetone whereupon the sodium salt of 4,4-bis-(p-hydroxy phenyl carboxymethyl ureido) diphenyl sulfone crystallizes. Yield: 79.6%; melting point: 155° C. (with decomposition).

*Example 7*

A solution of 37.3 g. of diphenyl sulfone-4,4'-dicarbamic acid chloride in 150 ml. dioxane is added to a solution of 25.5 g. of p-chloro aniline in 200 ml. of dioxane while stirring. The reaction mixture is heated on a water bath for one hour. After cooling, the precipitated 4,4'-bis-(p-chloro phenyl ureido) diphenyl sulfone is filterd off. Yield: 81.2%; melting point: 145-146° C.

*Example 8*

6.6 g. of 2,2'-dichloro-4,4'-bis-(m,p-dichloro phenyl ureido) diphenyl sulfide are dissolved in 40 ml. of dimethyl formamide. 200 ml. of glacial acetic acid and 3.2 g. of 30% hydrogen peroxide are added to said solution. The reaction mixture is heated on a water bath for one hour. On cooling, 2,2'-dichloro-4,4'-bis-(m,p-dichloro phenyl ureido) diphenyl sulfone precipitates. Yield: 63.9%; melting point: 268° C.

*Example 9*

100 ml. of acetic acid anhydride are gradually added to a solution of 25.9 g. of 4,4'-bis-(p-hydroxy phenyl ureido) diphenyl sulfone in 100 cc. of absolute pyridine. The mixture is heated for about 10 minutes on the water bath and is then allowed to stand for 24 hours. The resulting reaction mixture is poured into a large volume of water and the precipitate is filtered off by suction. On recrystallization from ethylene glycol mono-ethyl ether, 24.3 g. of 4,4'-bis-(p-acetoxy phenyl ureido) diphenyl sulfone of the melting point 198° C. are obtained. Yield: 81% of the theoretical yield.

*Example 10*

10.5 g. of N-ethyl-2,4-dinitro aniline are dissolved in 100 ml. of dioxane. 7.5 g. of diphenyl sulfone-4,4'-di-isocyanate dissolved in 120 ml. of dioxane are added thereto while stirring. The mixture is boiled under reflux for one hour. After cooling, the precipitate is filtered off by suction and recrystallized from a mixture of dimethyl formamide and water (10:1). 4,4'-bis-(o,p-dinitro phenyl-N-ethyl ureido) diphenyl sulfone of the melting point above 250° C. is obtained in a yield of 62% of the theoretical yield.

The preceding Example 9 illustrates another embodiment of the processes of making compounds of Formula I, wherein $R_1$ and $R_2$ indicate an esterified or etherified hydroxyl group. According to this embodiment first the hydroxyl or mercapto groups-containing bis-(phenyl ureido) diphenyl sulfone is prepared which is subsequently esterified or etherified according to methods known per se.

Likewise, the substituents $R_5$, $R_6$, $R_7$, and $R_8$ if they are hydroxyl groups, mercapto groups, and/or carboxyl groups, may also be esterified or etherified subsequently to the formation of the corresponding hydroxy, mercapto, and/or carboxy substituted diphenyl sulfone compounds. The preferred acylating agents used for preparing the esterified derivatives of compounds of Formula I are those which are derived from pharmaceutically acceptable acids, such as lower fatty acids, α-amino acids, benzoic acid, p-amino-benzoic acid, salicylic acid, nicotinic acid, isonicotinic acid, and the like.

In place of the aldehydes used in Examples 1d to 1g, there may be employed Schiff bases with other aldehydes such as aliphatic aldehydes, for instance, formaldehyde, glyoxal, aralkyl aldehydes, for instance, phenyl glyoxal, aromatic aldehydes, for instance, benzaldehyde and its substitution products, for instance, trimethoxy benzaldehyde, and others. Ketones which are suitable for forming the Schiff bases used in the preparation of compounds of Formula I are, for instance, acetyl pyridine, acetophenone, propiophenone, or their ring-substitution products, and others. The resulting Schiff bases are used as the one reaction component in the same manner as described in said Examples 1d to 1g.

The alkyl radicals $R_3$ and $R_4$ and those attached to the phenyl radicals $R_1$ and $R_2$ may be substituted not only by the carbonyl group and the bromine atom (Examples 1h, 4b, and 5) or by the carboxyl group (Example 6), but also by other substituents and especially by hydroxyl, carbonyl, carboxyl, amino groups, or halogen.

The new 4,4'-disubstituted diphenyl sulfone compounds according to the present invention are preferably administered orally in the form of tablets, pills, dragees, lozenges, and the like solid shaped preparations, or in powder or granule form, preferably enclosed in gelatin and the like capsules. Administration in liquid form, such as in the form of emulsions, suspensions, dispersions, sirups, fruit juices, and the like is also possible.

Such powders, granules, and mixtures to be used in the preparations of tablets and other shaped and/or compressed preparations may be diluted by mixing and milling with a solid pulverulent extending agent to the desired degree of fineness or by impregnating the already milled, finely powdered, solid carrier with a suspension of said compounds in water or with a solution thereof in an organic solvent such as ethanol, methanol, acetone, and others and then removing the water or solvent.

When preparing tablets, pills, dragees, and the like shaped and/or compressed preparations, the commonly used diluting, binding, and disintegrating agents, lubricants, and other tableting adjuvants are employed, provided they are compatible with said diphenyl sulfone compounds. Such diluting agents and other excipients are, for instance, sugar, lactose, levulose, starch, bolus alba; as disintegrating and binding agents, gelatin, gum arabic, yeast extract, agar, tragacanth, methyl cellulose, pectin; and as lubricants stearic acid, talc, magnesium stearate, and others.

The compounds according to Formula I may also be administered parenterally, for instance, in solution in propylene glycol or lactic acid ethyl ester, or in the form of suspensions in isotonic aqueous solutions.

Topical administration may also be employed. For this purpose the compounds of Formula I are incorporated into suitable ointment bases, such as with petrolatum, anhydrous lanolin, carbowax (solid polyethylene glycols), and the like. They may also be used in the forms of pastes which comprise zinc oxide, talc, titanium dioxide, stabilizers, thickening agents, and the like or in the form of creams prepared with wool fat, eucerin, wool fat alcohols, and the like.

The preferred 4,4'-disubstituted diphenyl sulfone according to the present invention which has proved of considerable clinical value is the 4,4'-bis-(p-hydroxy phenyl ureido) diphenyl sulfone. This compound possesses a low toxicity and is well tolerated. It has successfully been employed in the treatment of virus infections such as measles, chicken pox, influenza and others, and also in veterinary medicine in the treatment of foot-and-mouth disease, hog cholera, swine influenza, canine distemper, feline panleukopenia (feline distemper), fowl plague, avian leukosis, infectious bronchitis of chickens, and others.

As stated above, the compounds of Formula I and especially 4,4'-bis-(p-hydroxy phenyl ureido) diphenyl sulfone are well tolerated. Therefore, daily doses between about 0.750 g. and 2 g. have successfully been administered to patients suffering from influenza for three days or longer without any side-effects. Tablets and the like shaped preparations may contain between about 100 mg. and about 250 mg. per dosage unit. It is understood that the amounts administered and the dosage unit weights may vary.

In general, compounds belonging to the groups characterized by the following Formulas XVI, XVII, and XVIII have proved of special value, i.e. compounds which contain in each of the phenyl rings $R_1$ and $R_2$ a hydroxyl group:

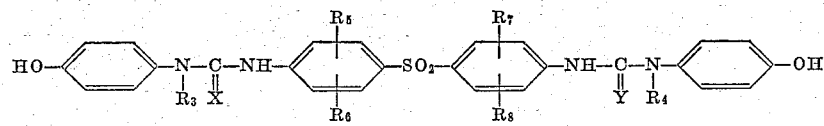

XVI

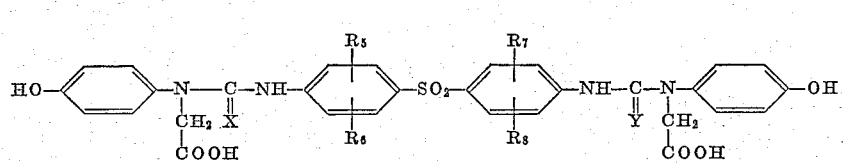

XVII

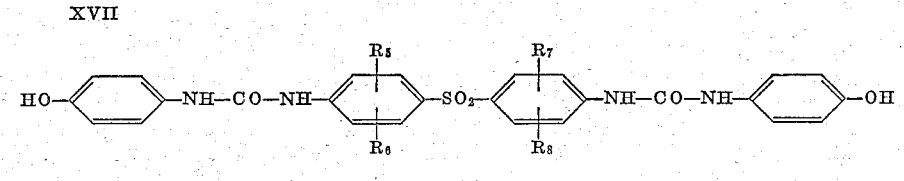

In these formulas the substituents $R_3$, $R_4$, $R_5$, $R_6$, $R_7$, $R_8$, X, and Y represent the same substituents as given hereinabove.

Of course, many changes and variations in the starting materials and reactants, the solvents or suspending agents, the hydrogen halide-binding agents, the reaction conditions, temperature and duration, the methods of working up the reaction mixture and of isolating and purifying the reaction products, and the like, may be made by those skilled in the art in accordance with the principles set forth herein and in the claims annexed hereto. Further tests have shown that especially the following compounds: 4,4'-bis-(p-acetyl phenyl thio-ureido) diphenyl sulfone, 4,4'-bis-(γ-pyridyl ureido) diphenyl sulfone, and the Schiff base of α-pyridine aldehyde and 4,4'-bis-(p-amino-phenyl ureido) diphenyl sulfone are also of value in the therapy of virus infections.

We claim:
1. The 4,4'-disubstituted diphenyl sulfone compound of the formula:

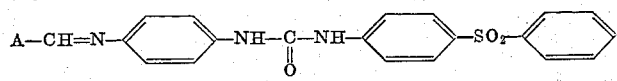

wherein A and B are members selected from the group consisting of pyridyl and quinolyl.

2. Bis-[N'-(4'-hydroxy phenyl) carbamido-N-phenyl-4]-sulfone.
3. Bis - [N' - (4' - hydroxy phenyl) thiocarbamido - N-phenyl-4]-sulfone.
4. Bis - [N' - (4' - hydroxy phenyl) - N' - (carboxy methyl) carbamido-N-phenyl-4]-sulfone.
5. The alkali metal salts of bis - [N' - (4' - hydroxy phenyl)-N'-(carboxy methyl) carbamido-N-phenyl-4]-sulfone.
6. Bis - [N' - (4' - butoxy phenyl) thiocarbamido - N-phenyl-4]-sulfone.
7. Bis - [N' - (2',4' - dimethyl phenyl) carbamido - N-phenyl-4]-sulfone.
8. Bis-[N'-(4'-chloro phenyl) carbamido-N-phenyl-4]-sulfone.
9. Bis-[N'-(4'-acetyl phenyl) carbamido-N-phenyl-4]-sulfone.
10. Bis - [N' - (4' - acetyl phenyl) thiocarbamido - N-phenyl-4]-sulfone.
11. Bis - [N' - (3',4' - dichloro phenyl) carbamido-N-phenyl-4]-sulfone.
12. Bis-[N'-(4'-lower alkoxy phenyl) carbamido-N-phenyl-4]-sulfone.
13. Bis-[N'-(4'-lower alkoxy phenyl) thiocarbamido-N-phenyl-4]-sulfone.
14. Bis - [N' - (γ - pyridyl) - carbamido - N - phenyl-4]-sulfone.
15. Bis-[N'-(4'-nitro phenyl) carbamido-N-phenyl-4]-sulfone.
16. Bis-[N'-(4'-α-bromo acetyl phenyl) carbamido-N-phenyl-4]-sulfone.
17. Bis-[N'-(3',4'-dichloro phenyl) carbamido-N-(2-chloro-phenyl-4)]-sulfone.
18. The 4,4'-disubstituted diphenyl sulfone compound of the formula

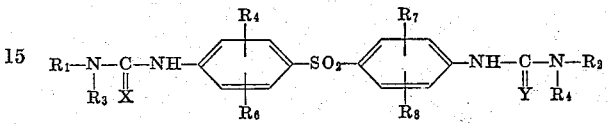

wherein $R_1$ and $R_2$ are members selected from the group consisting of γ-pyridyl and of phenyl which is substituted, at least in p-position, by a substituent selected from the group consisting of hydroxyl, lower alkoxy, lower alkanoyloxy, halogen, nitro, amino, azomethine resulting from the reaction of the amino group with pyridine aldehyde, azomethine resulting from the reaction of the amino group with quinoline aldehyde, lower alkyl, and lower alkanoyl;

$R_3$ and $R_4$ are members selected from the group consisting of hydrogen, lower alkyl, and carboxy lower alkyl;

$R_5$, $R_6$, $R_7$, and $R_8$ are members selected from the group consisting of hydrogen, lower alkyl, hydroxyl, lower alkanoyloxy, lower alkoxy, carboxyl, lower carbalkoxy, nitro, and halogen; and X and Y are members selected from the group consisting of oxygen and sulfur.

References Cited in the file of this patent

UNITED STATES PATENTS

| | | |
|---|---|---|
| 2,297,024 | Pohls et al. | Sept. 29, 1942 |
| 2,328,490 | Pohls et al. | Aug. 31, 1943 |
| 2,328,548 | Dohrn et al. | Sept. 7, 1943 |